(12) United States Patent
Hancock et al.

(10) Patent No.: US 6,457,618 B1
(45) Date of Patent: Oct. 1, 2002

(54) ALL TERRAIN VEHICLE REAR DECK BRACKET ASSEMBLY

(76) Inventors: Dennis H. Hancock, 5752 Silverstone Cir., Mountain Green, UT (US) 84050; Jeffrey D. Hancock, 6702 S. 1800 East, Uintah, UT (US) 94405

( * ) Notice: Subject to any disclaimer, the term of this patent is extended or adjusted under 35 U.S.C. 154(b) by 0 days.

(21) Appl. No.: 09/910,612

(22) Filed: Jul. 23, 2001

(51) Int. Cl.[7] ................................................. B60R 9/00
(52) U.S. Cl. ..................... 224/401; 224/319; 224/500; 224/501; 224/534; 224/547; 224/552; 224/558; 224/568; 224/913
(58) Field of Search ............................... 224/401, 913, 224/410, 412, 428, 431, 441, 442, 443, 445, 446, 448, 454, 455, 460; 211/64; D12/406, 407, 408, 409, 410; D3/254, 262; D6/552; D22/108

(56) References Cited

U.S. PATENT DOCUMENTS

| | | | | |
|---|---|---|---|---|
| 3,744,687 A | * | 7/1973 | Oreck ............................ 220/8 |
| 4,247,030 A | * | 1/1981 | Amacker ...................... 180/210 |
| 4,823,673 A | * | 4/1989 | Downing ...................... 224/401 |
| 5,706,990 A | * | 1/1998 | Lahrson ......................... 211/64 |
| 5,878,929 A | * | 3/1999 | Leonard ......................... 211/64 |
| 6,021,936 A | * | 2/2000 | Savant ........................ 224/282 |
| 6,142,349 A | * | 11/2000 | Roberson ..................... 224/401 |
| 6,145,718 A | * | 11/2000 | Edwards ...................... 224/401 |
| 6,382,484 B1 | * | 5/2002 | Savant ........................ 224/282 |

* cited by examiner

Primary Examiner—Stephen K. Cronin

(57) ABSTRACT

An all terrain vehicle (ATV) mounting bracket assembly that is adapted to mount to the rear deck of an ATV and to hold a scabbard or gun case outwardly of either side or the rear of the vehicle and in position to allow a tong gun to be easily inserted into or withdrawn from such scabbard or gun case includes a universal mounting plate to be secured to an ATV deck, a support plate extending upwardly from the universal mounting plate and outwardly from the vehicle and a holding plate carried by the support plate and capable of being tipped to insure proper angular mounting of a scabbard or gun case fixed to the holding plate.

4 Claims, 3 Drawing Sheets

ALL TERRAIN VEHICLE REAR DECK BRACKET ASSEMBLY

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to support brackets to be mounted on all terrain vehicles so that the vehicle can carry objects such as long guns in protective carrying cases and scabbards. The guns are readily accessible while still being securely held and protected against moisture and dust.

2. Description of the Related Art

All terrain vehicles (ATV's) frequently are equipped with rear decks that are used to support and hold articles being carried by the vehicle. Such articles commonly may include, for example, clothing, camp gear, baggage, tools, weapons and game that has been bagged and is being transported.. Hunters using ATV's frequently desire to have long guns such as rifles and shotguns available for substantially immediate use, even as the long guns are carried by the rear decks and are enclosed to provide dust and moisture protection.

It has been found that if the long guns of hunters are secured to extend across a portion of the surface of the rear deck of an ATV a significant portion of the rear deck then is no longer available for carrying other articles. If other articles are secured to the surface of the rear deck, along with long guns being transported, access to the guns is often restricted and the user of the ATV no longer has substantially immediate access to the long guns, which may be buried beneath other articles being carried. Consequently, it has been found desirable to provide a means for supporting and holding long guns, preferably in a scabbard or protective gun case to the rear deck of an ATV, without reducing the surface area of the rear deck available for transporting other articles.

BRIEF SUMMARY OF THE INVENTION

The present invention provides a bracket assembly that is easily mounted to the rear deck found on most models of ATVs currently being marketed. The bracket assembly of the invention will securely support a long gun, that is securely enclosed in a scabbard or gun case, outside the surface area of the rear deck of an ATV so that the surface of the rear deck remains free to receive other articles or items carried on the ATV.

The bracket of the invention is universally mountable to project from the sides or the rear edge of the deck of an ATV and will support long guns in a barrel down, selected angular position that will insure quick access and retrieval of a carried long gun

OBJECTS OF THE INVENTION

A principal object of the present invention is to provide a universally mountable bracket assembly that will mount to a deck on the back of an ATV and that will extend selectively outward from either side or the rear of the deck.

Another object is to provide a bracket assembly that will securely hold a scabbard or gun case outside the surface area of the deck on the back of an ATV such the scabbard or gun case and a long gun therein is readily available to an operator of the vehicle.

FEATURES OF THE INVENTION

Principal features of the mounting bracket assembly of the invention include a universal mounting plate that is attached to a deck on the back of an ATV with U-bolts, anchor plates and nuts and that has an upturned flange with aligned spaced holes, through which bolts are inserted as a support plate is secured thereto. The support plate is selectively positioned to align the holes through the upturned flange with holes through one end of the support plate.

The ends of the support plate are offset and the support plate can be mounted to either face of the upturned flange, as may be required to insure positioning of a downwardly extending scabbard or gun case, carried by a holder plate, a desired spaced distance from a wheel of the ATV. Conventional spacer plates or washers can also be placed between the upturned flange and the support plate to further vary the spacing of a carried gun scabbard or case outboard from a wheel of the ATV, should that be desirable. Nuts are threaded onto the bolts inserted through the holes of the upturned flange and the aligned holes through the one end of the support plate.

The elongate holder plate has a flat support surface and a connector flange with aligned holes spaced along the connector flange. A bolt is inserted through a selected one of the aligned holes spaced along the connector flange and a hole through the end of the support plate remote from the mounting plate and upturned flange. A nut is threaded onto the inserted bolt to clamp the holder plate to the support plate. A locking bolt is inserted through an adjacent one of the aligned holes through the connector flange and a selected one pair included as part of a series of arcuately aligned holes through the end of the support plate remote from the mounting plate. Spaced apart holes through the flat support surface provide means for attachment of buckle or Velcro straps that will extend around and securely hold a gun scabbard or case in place on the holder plate. The straps may also be wrapped and tightened around the holder plate and a scabbord or gun case positioned on the holder plate, if desired.

The angle at which the holder plate extends with respect to the support plate and mounting plate is determined by which of the arcuately aligned holes the anchor bolt is inserted. A wing nut is threaded onto the anchor bolt. The angle of the holder plate is easily changed, merely by removing the wing nut and the anchor bolt and pivoting the holder plate to align the hole for the anchor bolt with another of the arcuately aligned holes, reinserting the anchor bolt and screwing the wing nut onto the anchor bolt. Conventional spacer plates or washers can also be inserted between the connector flange and the support plate to vary the spacing of the holder plate from the universal mounting plate and to provide clearance from a wheel, should that be determined to be necessary.

Other objects and features of the invention will become apparent to those skilled in the art to which the invention pertains from the following detailed description and drawings, disclosing what is presently contemplated as being the best mode of the invention.

DETAILED DESCRIPTION

Figure 1:
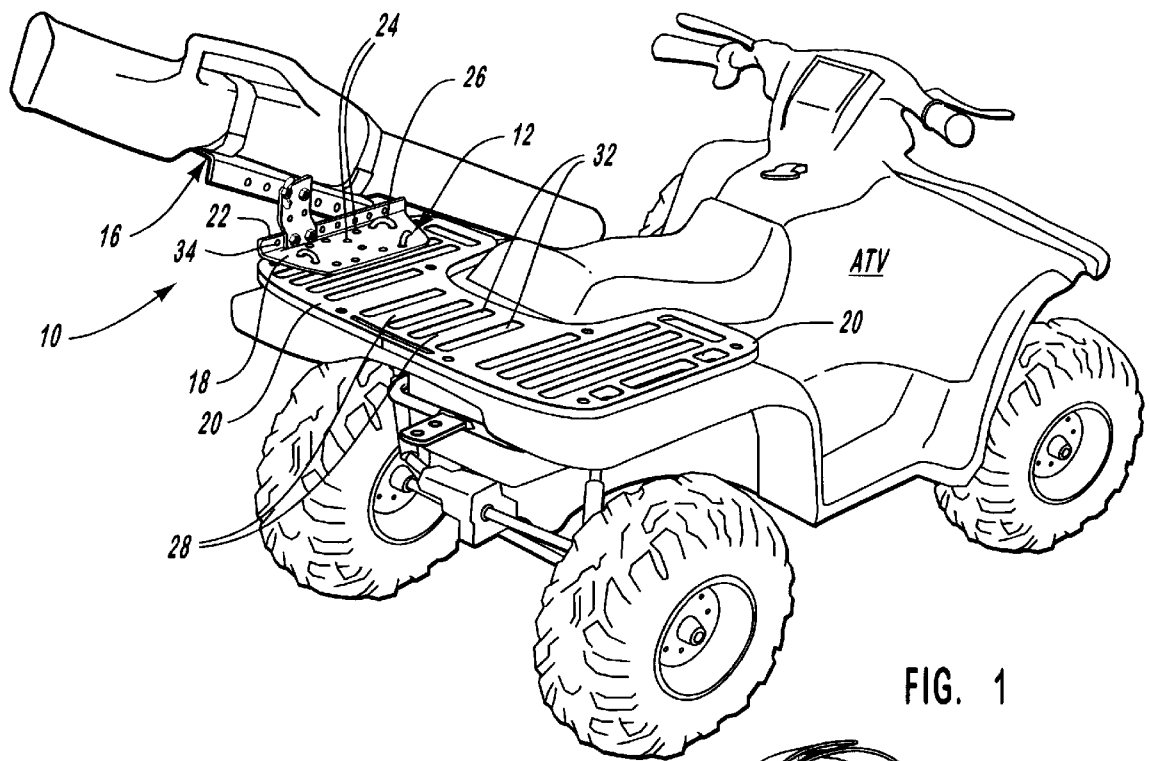
FIG. 1 is a perspective view of an ATV having the bracket assembly of the invention mounted on a rear deck and a gun case carried by the bracket.
Figure 2:
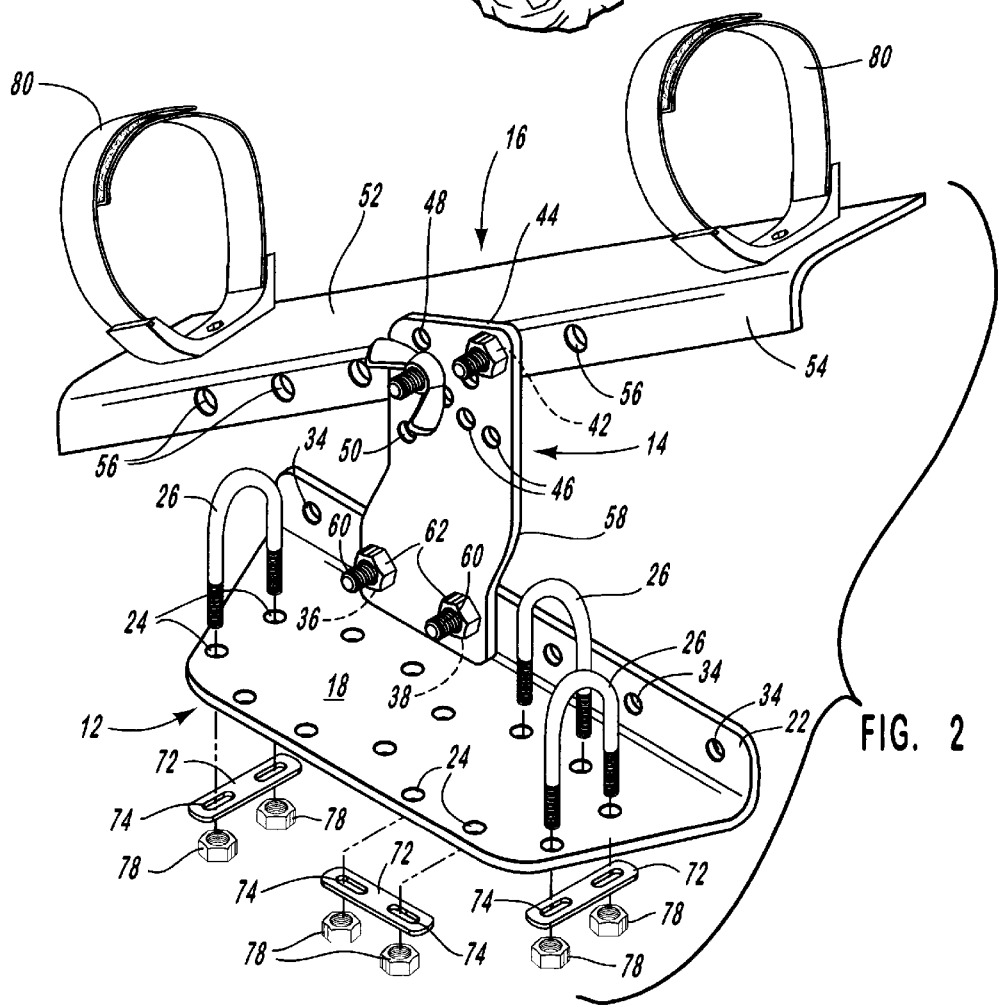
FIG. 2, an enlarged perspective view of the bracket assembly of the invention.
Figure 3:
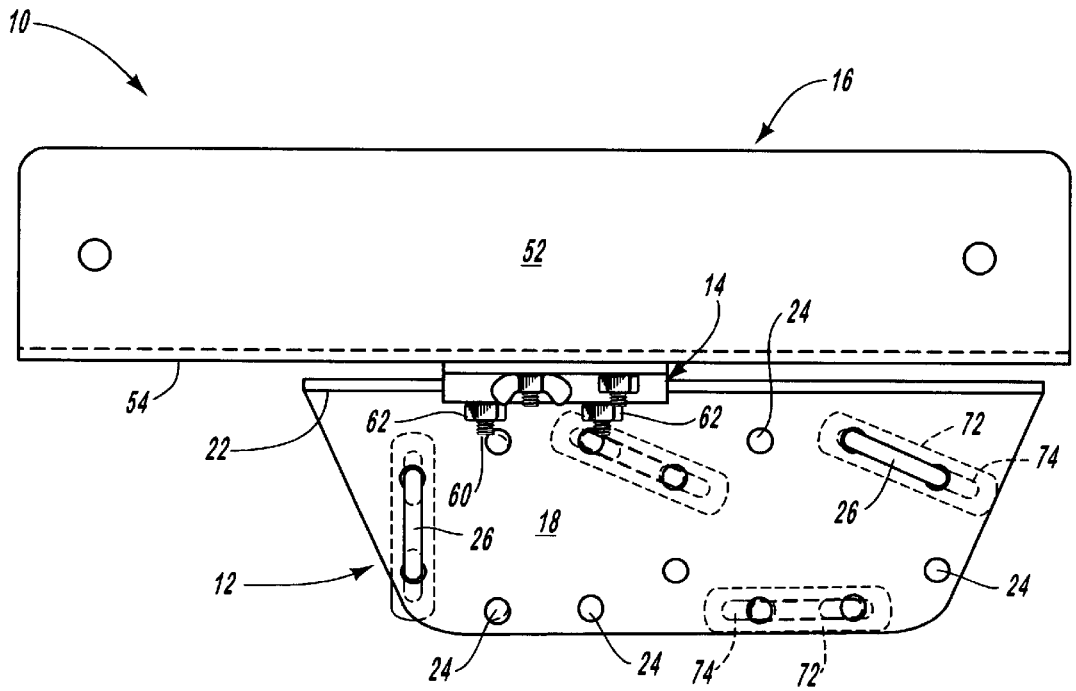
FIG. 3, a top plan view of the bracket assembly.
Figure 4:
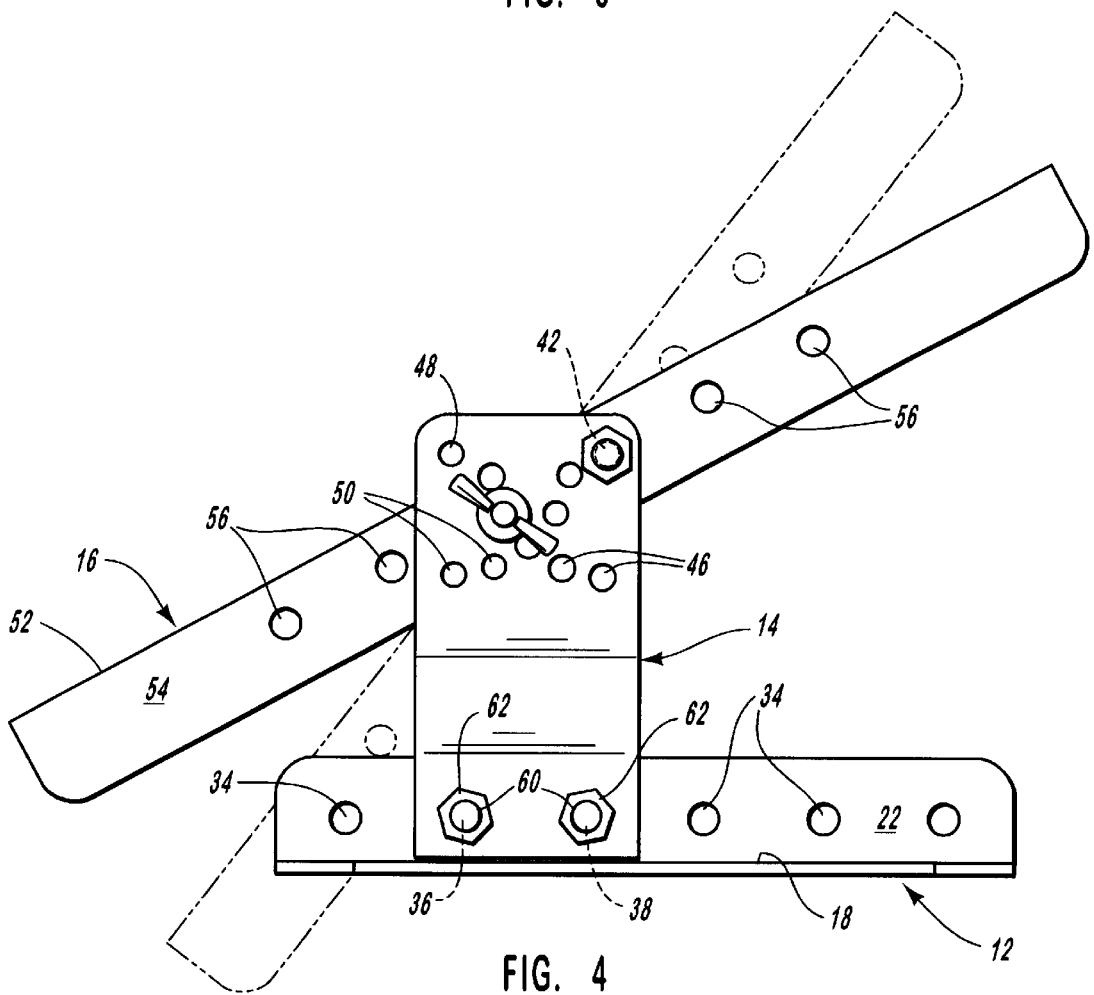
FIG. 4, a side elevation view.
Figure 5:
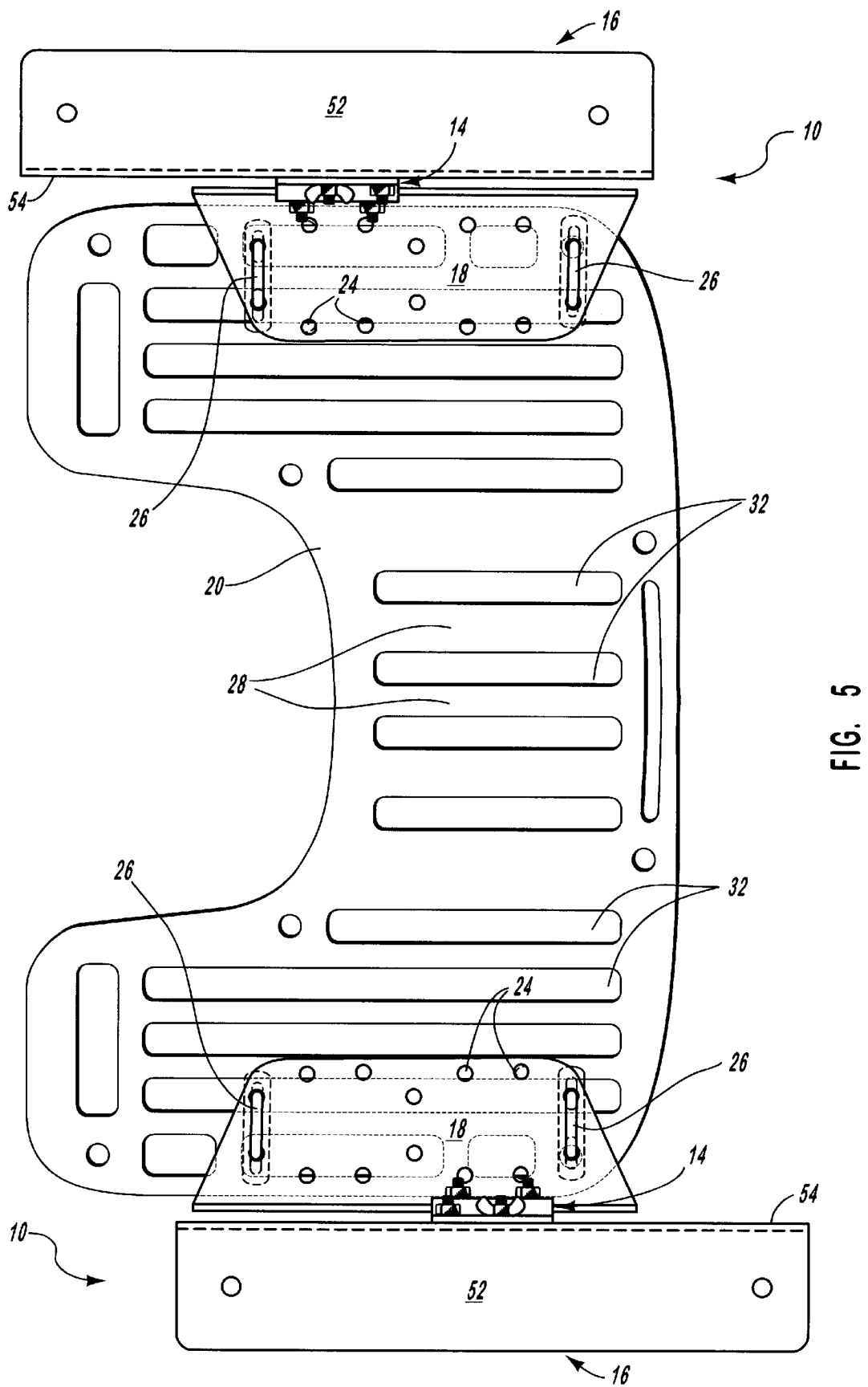
FIG. 5, a top plan view of a deck of an ATV with a pair of the bracket assemblies of the invention attached thereto.

Referring now to the drawings:

In the illustrated preferred embodiment, the bracket assembly of the invention includes, shown generally at 10 includes a universal mounting plate 12, a support plate 14 and a holder plate 16.

Universal mounting plate 12 has a flat sheet 18 that will rest on a deck 20 attached to the rear of an all-terrain vehicle (ATV) and an upturned flange 22 formed along one edge of the flat sheet 18. Spaced holes 24 are formed through the flat sheet 18 to receive the ends of U-bolts 26 that are inserted through the flat sheet to straddle spaced apart ribs 28 formed in the deck 20 of the ATV. Typically, the decks of ATV's include ribs, such as shown at 28, spaced apart by slots 32 extending through the decks. The upturned flange 22 has holes 34 there through and spaced along the, length of the flange.

Support plate 14 is elongate and has a pair of holes 36 and 38 extending through the support plate, adjacent to one end 40 thereof. Holes 36 and 38 are spaced to align with adjacent ones of holes 34 through the upturned flange 22. A hole 42 is formed through the support plate 14 at the opposite end 44 thereof and a series of spaced apart holes 46 are equally spaced from the hole 42 and form an arc around a portion of the hole 42. Another hole 48 is also formed through the end 443 and is equally spaced from another series of arcuately spaced apart holes 50 that are equally spaced from the hole 48. Hole 42 may be the end hole of the arcuate series of holes 46. Hole 48 may be an end hole of the arcuate series of holes 50.

Holder plate 16 includes an elongate flat plate portion 52 having a connector flange 54 along one side thereof. Holes 55 through flange 54 are spaced apart the same distance as the distance from the hole 42 to each of the holes 46 forming the arc around the portion of hole 42. Likewise holes 56 through flange 54 are spaced apart the same distance as the distance between holes 48 and the holes 50 forming the arc around hole 48. Support plate 14 is bent at 58, intermediate its length so that the ends 40 and 44 are offset.

In use, the mounting bracket assembly 10 is assembled by connecting the support plate 14 to the upturned flange 22 of the universal mounting plate with bolts 60 inserted through holes 34 of the upturned flange and holes 36 and 38 of the support plate. Nuts 62 are threaded onto the bolts 60. Holder plate 16 is secured to the end of support plate remote from the universal mounting plate 12 by bolts 66 inserted through hole 42 and a selected hole 46 or by inserting bolt 66 through hole 48 and a selected hole 50. Nuts 68 are threaded onto the bolts 66.

The assembled mounting bracket assembly is used by securing the universal mounting plate 12 to the deck 30 of an ATV. Two or more of the U-bolts 26 are inserted through holes 24 through the universal mounting plate and straddle ribs 28 of the deck 30. Anchor plates 72 each have spaced apart holes 74 to fit over the ends of the U-bolts 26 and nuts 78 are threaded onto the ends of the U-bolts to clamp the mounting plate to the deck.

Velcro straps 80 are secured to the holder plate 16 by spaced apart bolts 82 inserted through holes in the straps and through the holder plate.

Although a preferred form of our invention has been herein disclosed, it is to be understood that the present disclosure is by way of example and that variations are possible without departing from the subject matter coming within the scope of the following claims, which subject matter we regard as our invention.

We claim:

1. An all terrain vehicle rear deck bracket assembly comprising a universal mounting plate including a flat surface with spaced apart holes therethrough and an upwardly extending flange along one side of said flat surface, said flange having spaced apart holes along the length thereof;

an elongate support plate having one end thereof bolted to said upstanding flange with bolts extending through selected pairs of said holes through said upstanding flange, a first hole through said elongate support plate adjacent to an opposite end of said support plate and a series of holes in an arcuate formation through said elongate support plate, each said hole in said arcuate formation being equally spaced from said first hole;

a holder plate having a flat plate and a connector flange extending along one edge of said flat plate and a plurality of holes spaced along the length of said connector flange; and a first bolt extending through a selected one of said holes through said connector flange and said first hole through said opposite end of said support plate and a second bolt extending through another hole through said down turned flange and through a selected one of said holes forming said series of holes through said support plate and in an arcuate formation; and nuts threaded tightly onto each of said bolts.

2. An all terrain vehicle rear deck bracket assembly as in claim 1, further including a plurality of U-bolts each inserted through the spaced apart holes through the universal mounting plate and an anchor plate having spaced apart holes therethrough to receive the legs of each said U-bolt, and nuts threaded onto the legs of said U-bolt.

3. An all terrain vehicle rear deck bracket assembly as in claim 2, wherein the support plate further includes a second hole through the support plate adjacent to the opposite end and a second series of holes in an arcuate formation through the support plate and with each hole in said second series of holes being equally spaced from said second hole.

4. An all terrain vehicle rear deck bracket assembly as in claim 2, further including spaced apart strap means fixed to the holder plate.

* * * * *